(No Model.) 6 Sheets—Sheet 1.
C. A. HANSEN & O. G. GULBRANDSEN.
MACHINE FOR MAKING HORSESHOE NAILS.
No. 413,937. Patented Oct. 29, 1889.
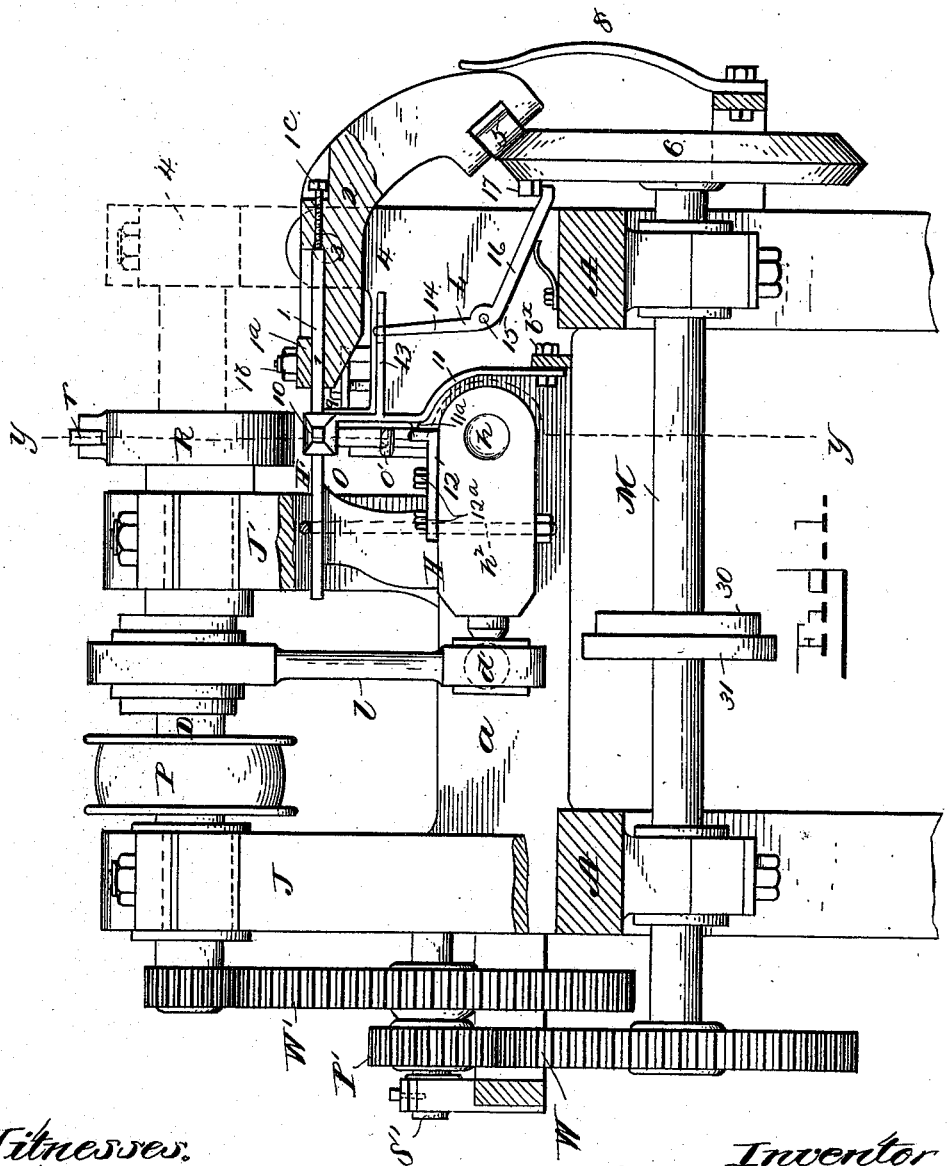
Witnesses:
J. Thomson Cross
J. Theo. Sword
Inventor
Christian Almar Hansen
and Ole Gunerius Gulbrandsen
per Henry Orth
Attorney.

(No Model.) 6 Sheets—Sheet 2.
C. A. HANSEN & O. G. GULBRANDSEN.
MACHINE FOR MAKING HORSESHOE NAILS.
No. 413,937. Patented Oct. 29, 1889.
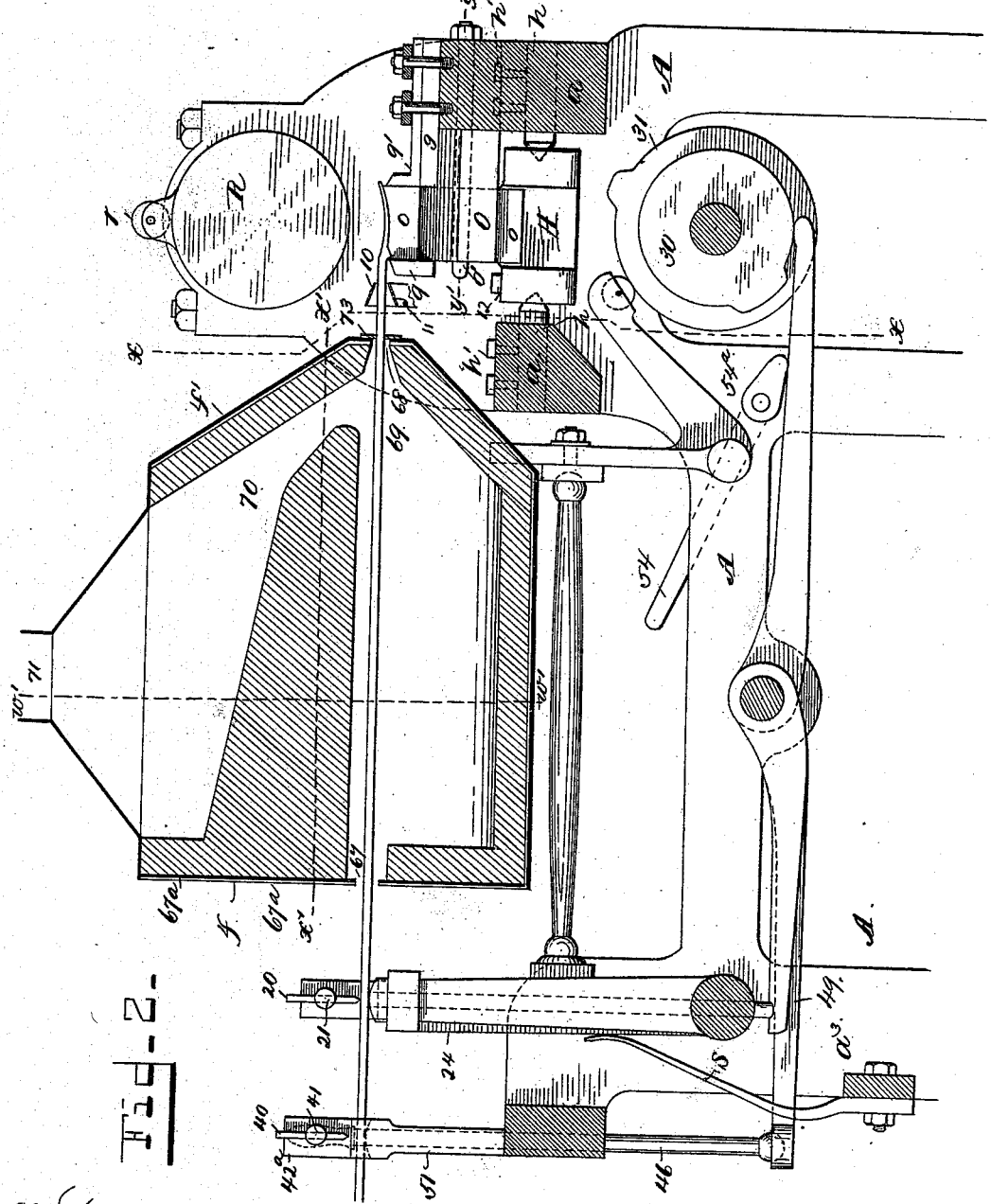

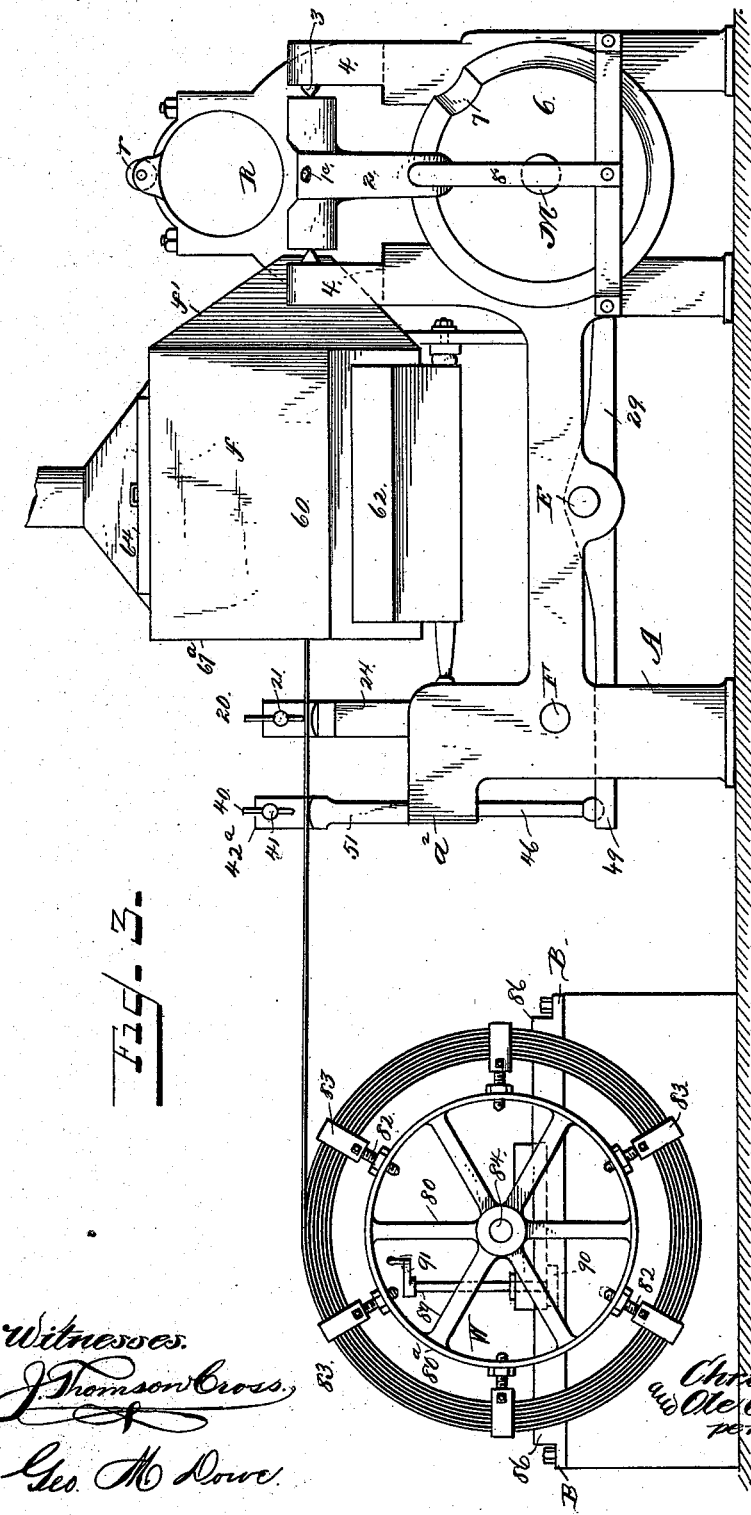

(No Model.) 6 Sheets—Sheet 4.
C. A. HANSEN & O. G. GULBRANDSEN.
MACHINE FOR MAKING HORSESHOE NAILS.
No. 413,937. Patented Oct. 29, 1889.
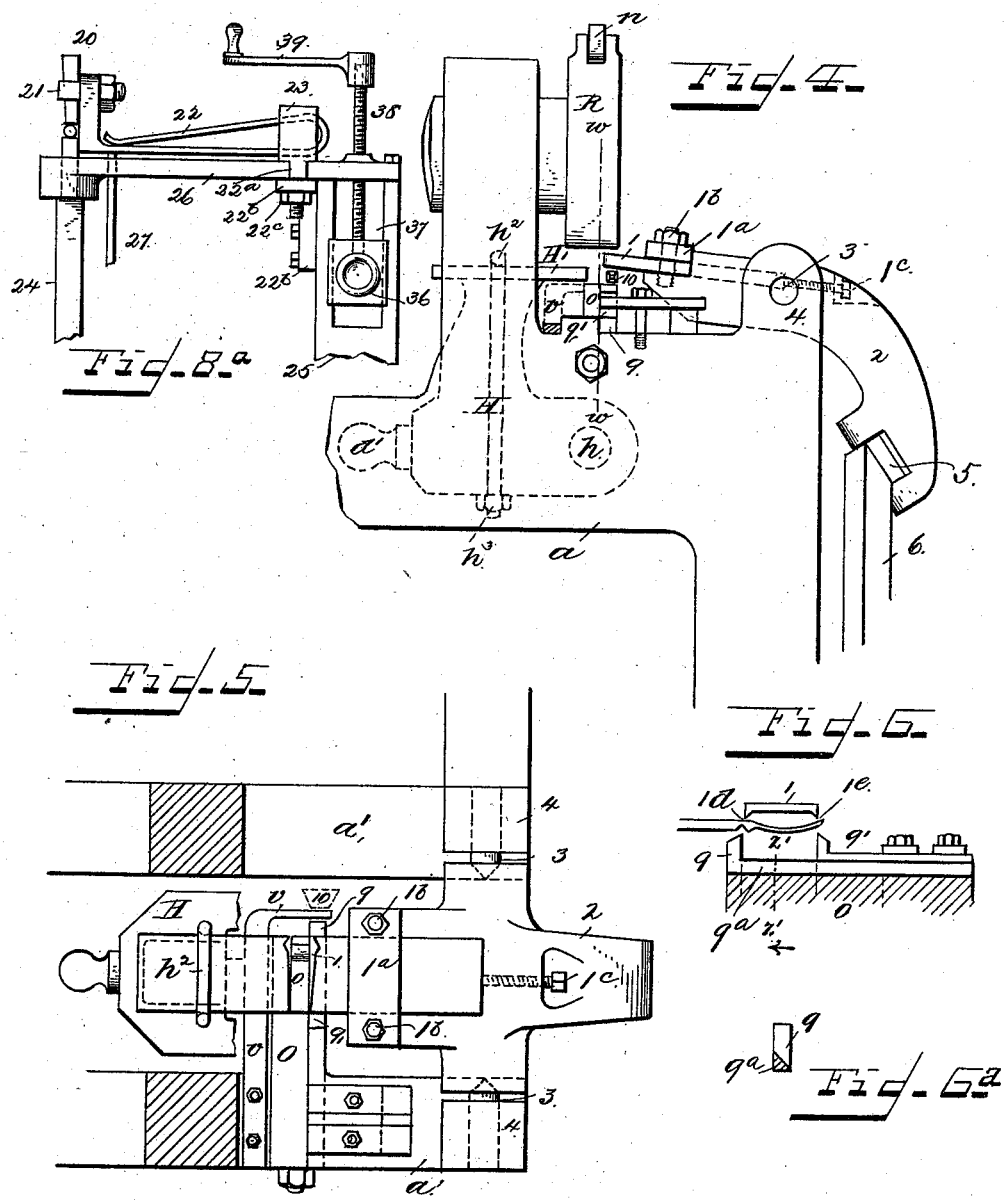
Witnesses.
J. Thomson Cross
Geo. M. Dowe
Inventors.
Christian A. Hansen
and Ole G. Gulbrandsen
per Henry M. ——
Att'y.

(No Model.) 6 Sheets—Sheet 5.
C. A. HANSEN & O. G. GULBRANDSEN.
MACHINE FOR MAKING HORSESHOE NAILS.
No. 413,937. Patented Oct. 29, 1889.
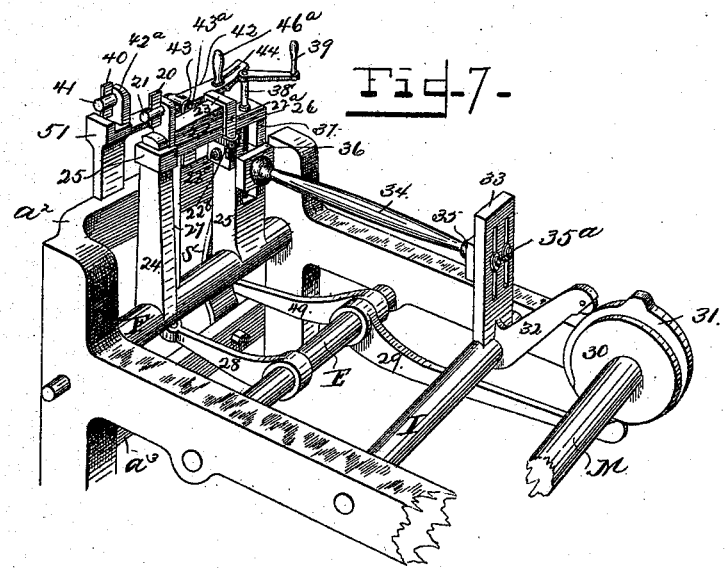
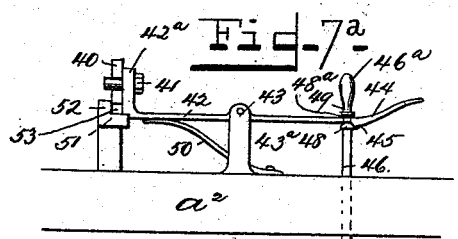
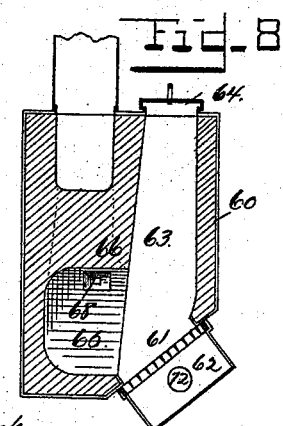
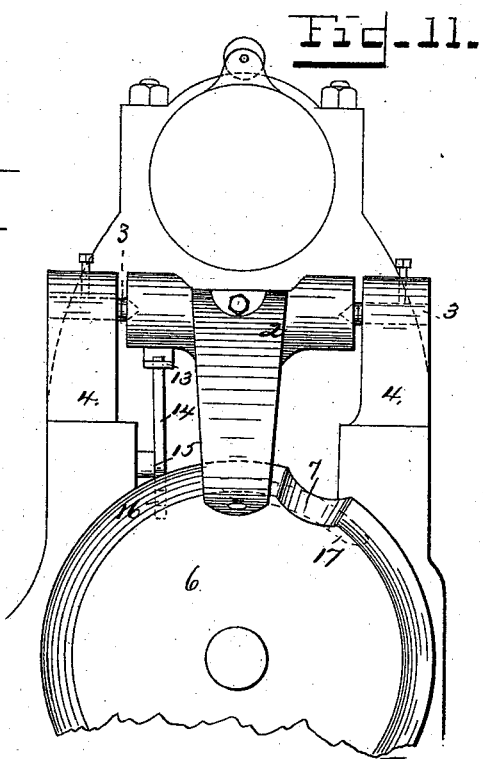

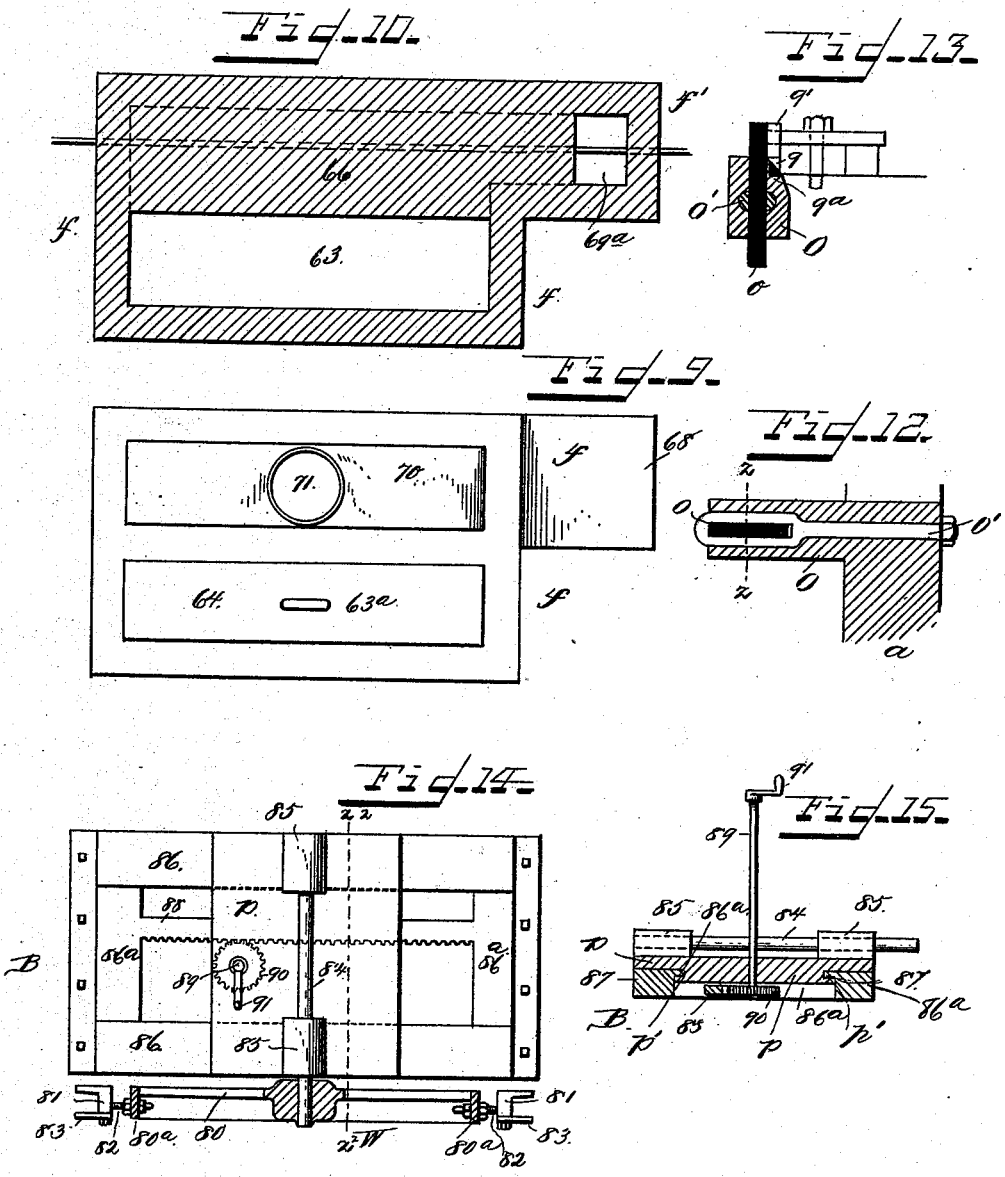

UNITED STATES PATENT OFFICE.

CHRISTIAN ALMAR HANSEN AND OLE GUNERIUS GULBRANDSEN, OF CHRISTIANIA, NORWAY.

MACHINE FOR MAKING HORSESHOE-NAILS.

SPECIFICATION forming part of Letters Patent No. 413,937, dated October 29, 1889.

Application filed May 17, 1889. Serial No. 311,103. (No model.)

*To all whom it may concern:*

Be it known that we, CHRISTIAN ALMAR HANSEN and OLE GUNERIUS GULBRANDSEN, subjects of the King of Norway, residing at Christiania, Norway, have invented certain new and useful Improvements in Horseshoe-Nail Machines; and we do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Referring to the accompanying drawings, Figure 1 is a section, taken on or about on the line $x\ x$ of Fig. 2, of a horseshoe-nail machine embodying our invention, the reel for the continuous nail-rod being omitted. Fig. 2 is a section taken on the line $y\ y$ of Fig. 1. Fig. 3 is a side elevation of the machine. Fig. 4 is a detail elevation of the forging devices, showing the combined cutter and anvil in its elevated position ready to sever the nail from the nail-rod. Fig. 5 is a detail plan view of a portion of the forging devices shown in Fig. 4. Fig. 6 is a detail section taken on the line $w\ w$ of Fig. 4. Fig. $6^a$ is a section of cutter 9 on line $z'\ z'$ of Fig. 6, looking in the direction of the arrow. Fig. 7 is an isometric view showing the automatic feeding and nail-rod-holding mechanism, Figs. $7^a$ and $8^a$ being detached detail views of parts of said mechanism. Fig. 8 is a cross-section of the heating-furnace, taken on the line $w'\ w'$ of the furnace shown in Fig. 2, Fig. 9 being a top plan view, and Fig. 10 a section on the line $x'\ x'$, of the furnace shown in said Fig. 2. Fig. 11 is a detail end view of a portion of the machine. Fig. 12 is a section taken on the line $y'\ y'$ of Fig. 2, and Fig. 13 is a section taken on the line $z\ z$ of Fig. 12. Fig. 14 is a top plan view of the reel and reel-support shown in Fig. 3, and Fig. 15 is a section taken on the line $z^2\ z^2$ of Fig. 14.

The invention relates to that class of horseshoe-nail machines in which the forging of the nail is effected by a roller operating in conjunction with an anvil, and a side hammer operating likewise in conjunction with an anvil.

In this class of machines the nail-rod after the forging of a nail has been completed is moved longitudinally for a distance at least equal to the length of the forged nail in order to carry such nail to the cutters to be severed from the rod.

One of the objects of this invention is to provide means whereby a minimum motion is imparted to the nail-rod in order to bring it to the cutters and feed it forward a nail-length to the forging devices; and the invention has for its further object certain improvements in said feeding devices as well as in the devices for holding the nail-rod during the forging of a nail, so as to cause said devices to operate automatically and differentially—that is to say, with varying amplitudes of motion, so that nails of varying length may be forged in one and the same machine.

The invention has for its further object to save the usual labor of preheating short nail-rods and carrying such rods at comparatively short intervals from the preheating-furnace to the machine. This we accomplish by providing a furnace constructed to give sufficient heat to heat the nail-rod to the proper temperature, and by providing a reel, upon which is wound a continuous nail-rod, from which the nails are forged.

To these ends the invention consists in the combination, with the hammer, of a combined anvil and cutter; in the combination, with the forging devices and cutters, of mechanism for carrying the nail end of the rod from one to the other of said devices; in the combination, with the forging devices, of a reel for the reception of a continuous nail-rod and of a furnace for heating the rod and maintaining the same at a proper temperature, and in the combination, with the forging mechanism, of feeding devices and devices for holding the nail-rod during the operation of forging a nail and of severing such nail from the rod.

The invention consists, finally, in details of construction and in combinations of co-operative parts or elements, substantially as hereinafter described, and as set forth in the claims.

Referring to the drawings, D, Fig. 1, is the driving-shaft, to which motion is imparted by a pulley P, mounted thereon, said shaft being supported in standards J and J', and carries at its outer end a disk R, that is provided with suitable bearings for the usual forging-roll $r$. It is obvious that the driving-shaft may be caused to extend beyond the disk and find an additional end bearing in a suitable standard 4, (shown in dotted lines in Fig. 1,) and extending vertically from the main frame A, as is usually the case in this class of machines. We prefer, however, to dispense with the end bearing-standard, for the reason that the forging and cutting devices are left unobstructed, and are therefore of ready access for any purpose, and this is a material advantage. The forging-roller $r$ co-operates with an anvil $o$, the stock O whereof forms an integral part of the cross-girt $a$, and is slotted for the reception of the said anvil, which is secured in position by means of a slotted bolt $o'$, as shown in dotted lines in Fig. 2 and in full lines in Figs. 12 and 13.

H indicates the hammer-stock, to which is adjustably secured the hammer H' by means of a U bolt or strap $h^2$ and nuts $h^3$ in a well-known manner and for well-known purposes. The hammer-stock H is pivoted on cone-pins $h$, secured in the cross bars or girts $a\ a'$ of the main frame A by means of set-screws $h'$, as shown in Fig. 2. The hammer H' co-operates with an anvil 1, that is constructed and operated to act also as a cutter. This anvil 1 is secured to an anvil-stock 2 by means of a strap $1^a$ and bolts $1^b$, and is adjusted when said strap is loosened by unscrewing the bolts and by means of a set-screw $1^c$, for purposes well understood. The front face—that is to say, that face which co-operates with the hammer H'—has substantially the same form as that of said hammer—namely, the form of the nail to be forged, as more plainly shown in Fig. 5—while the under side of the anvil is ground out, so as to form two cutting-edges $1^d$ $1^e$, as more plainly shown in Fig. 6. These cutting-edges co-operate with corresponding cutters 9 and 9', secured to the cross girt or bar $a$ of the main frame A, said cutters being arranged one on top of the other, and are of such lengths as to project on opposite sides of the cutter end of the anvil 1, as shown in Figs. 2, 5, and 6. The portion $9^a$ of the shank of the cutter 9 adjacent to anvil $o$ and below anvil-cutter 1 is beveled, as shown in Figs. $6^a$ and 13, so as to guide the cut nail away from the cutters to the ground. The anvil 1 has a periodical vertical reciprocating or vibrating motion imparted thereto that is timed to a corresponding horizontal motion of the nail-rod.

The vibratory motion of the anvil is imparted thereto as follows: The anvil-stock 2 is fulcrumed on cone-pins 3, secured in bearings formed in the standards 4 of the main frame, and said stock has a curved tail, in the end of which is journaled a roller 5, that rides on the beveled face of a cone or beveled disk 6, and is held in contact therewith by a spring 8, as shown in Figs. 1, 3, and 11. The cone or beveled disk has a notch or recess 7 formed in its beveled or conical face, so that at each revolution of the disk the roller 5 of the anvil-cutter will drop into the notch, thus lifting the outer or cutter end of the anvil-frame between the cutters 9 and 9', and sufficiently above the same to admit of the forged nail to be brought onto said cutters. As the disk continues to revolve and the roller passes from the notch 7 onto the cone-face of the disk, the cutter end of the anvil is again brought down, thereby severing the nail from the rod, said nail sliding along the inclined face $9^a$ of the cutter, and falling thence to the ground or floor.

The advantage of the construction and operation of the combined anvil and cutter and the cutters 9 and 9' lies in that there is but a very slight lateral displacement of the nail-rod necessary to bring the forged nail between the cutters—in fact, but very little greater than the diameter of the nail-rod—while in all machines of this class with which we are acquainted the rod is fed longitudinally to the cutters and a distance not less than the length of the forged nail, and in some machines even twice that distance. This lateral motion is imparted to the nail-rod through the medium of the following instrumentalities: The nail-rod passes through a guide 10, that is secured to one end of a more or less elastic carrier-bar 11, that at its lower end is bolted at $b^\times$ to the main frame or to a bracket or arm thereof. (See Fig. 1.) The elastic carrier 11 has a longitudinal arm 13, that is slotted, and into said slot extends the end of the arm 14 of a bell-crank lever L, fulcrumed at 15 to the main frame, the end of the other arm of said lever lying in the path of a cam projection 17 on the inner face of cone-disk 6, at a point immediately opposite or behind the notch 7, the cam-face being slightly longer than the notch, so that just before the roller 5 enters the notch 7 the cam-face 17 engages the arm 16 of the bell-crank lever L, depressing the same thereby and drawing the carrier 11 toward the cutter-anvil 1, and as said roller drops into the notch 7, thereby lifting the anvil-cutter, the greatest diameter of the cam-face 17 will be in contact with the lever-arm, thus drawing the nail-rod over sufficiently to bring the nail between the cutters, as shown in Figs. 2 and 4. After the nail has been severed the anvil 1 at once returns into its normal position; but this is not the case with the nail-rod, which, owing to the extent of the cam-face 17, will be held in or approximately in the position last described during the feeding operation, which latter will be described hereinafter.

The object of employing a more or less elastic support for the outer end of the nail-rod is not solely to provide a carrier for supporting the nail-rod and carrying the same to and from the anvil and cutters, as it is obvious that a rigid hinged carrier may be employed for this purpose since said carrier is positively operated by the mechanism described; but the object is to impart to the nail-rod a vibratory motion during the forging of the nail, which motion is imparted to the rod by the hammer H', on the stock H of which is secured a tappet 12, that operates upon a boss or projection 11$^a$ on the carrier 11. This tappet 12 is adjustable through the medium of the fastening-bolts 12$^a$, by means of which it is secured to the hammer-stock H, said bolts passing through a longitudinal slot formed in the shank of said tappet, so that the amplitude of the vibrations of the carrier can be varied. By imparting a vibratory movement to the carrier 11 and the nail-rod the latter is positively moved from the center of the vertical anvil o to the horizontal anvil 1, which without this provision would have to be done by the hammer H' and expose the nail-rod end to the danger of being bent thereby and the forged nail rendered useless. By making the carrier sufficiently elastic to automatically carry the nail-rod back to its position under the forging-roller, mechanism for doing this positively is dispensed with. The cone-disk 6 is mounted on a shaft M, driven from main shaft D through gearing consisting of pinion P on said main shaft, wheel W' on a counter or short shaft S', pinion P' on said short shaft, and a gear-wheel W on shaft M, which latter shaft also carries two cam-disks 30 and 31, that operate the holding and feeding devices, which we will now describe, referring more particularly to Figs. 2, 7, 7$^a$, and 8$^a$.

I, E, and F indicate three rock-shafts mounted in the main frame. The shaft I has two radial arms, one 32, in the end of which is journaled a roller that rides upon the cam 31 on shaft M, and another 33, that has two longitudinal slots for the passage of two bolts 35$^a$, that project from a block 35, in whose face is formed a semi-spherical socket-bearing (not shown) for the spherical head of a push rod or bar 34. By means of the slots in radial arm 33 and the bolts 35$^a$ the block 35 may be adjusted vertically on the arm 33 to vary the throw of the push-bar 34. The rock-shaft F has also two radial arms, one 25, whose upper end is forked for the reception of a slide-block 36, that has in its face a semi-spherical socket that serves as a bearing for the spherical head at the opposite end of the push rod or bar 34.

A spring S, Figs. 2 and 7, bolted to the lower rear cross-girt $a^3$ of the main frame, bears with its free end upon the radial arm 25 and serves to bring it back into its normal position when displaced, for purposes hereinafter explained. The radial arm 25 on rock-shaft F is connected with the other radial arm 24 on said shaft by a cross-bar 26, one end of which is slotted. The upper end of the radial arm 24 is of reduced dimensions, so as to form a shoulder, upon which the end of the cross-bar 26 rests, said attenuated end of the radial arm 24 projecting slightly above the upper face of the slotted end of the cross-bar and constituting one of the jaws of a clamp for holding the nail-rod, a dog 20 constituting the other jaw. In the cross-bar 26 is formed a screw-threaded opening, in which works a screw 38, provided with a suitable handle 39, the said screw being connected with the bearing-block 36, and providing the necessary means for adjusting the throw of the push-rod 34 in conjunction with the adjustment of the bearing-block 35, whereby the feed of the nail-rod is regulated. The dog 20 is secured in the slot of a bolt 21, that is itself secured by a nut to a vertical arm at the free end of one of the limbs of a U-spring 22, that is clamped at its bent end between a strap 23 and the cross piece or bar 26, that connects the radial arms 24 and 25. The legs 22$^a$ of the strap pass through eyes formed in a bracket 22$^b$, that is bolted to the radial arm 25, and said strap is held in position by means of nuts 22$^c$ on its threaded legs, so that the tension of the spring may be adjusted by loosening or tightening the said nuts. Of course it will be understood that the eyes through which the leg-straps pass may be formed on the cross-bar 26. The free end of one of the legs of spring 22, as more plainly shown in Fig. 8$^a$, bears upon the leg that carries the dog 20. The stress exerted is therefore a downward one, the tendency being to hold the dog in contact with the upper face of the radial arm 24. The forward end of the spring is supported on a lifter-rod 27, that extends through cross-bar 26 and shaft F, its lower end resting in a bearing formed on the free end of a radial arm 28 on rock-shaft E, for purposes presently to be explained.

On the end cross-bar $a^2$ of the main frame A is formed or secured a standard 51. The upper rounded or curvilinear face constitutes the jaw of a second clamp for holding the nail-rod, a dog 40 constituting the other jaw of said clamp. The dog 40 is adjustably secured in precisely the same manner as the dog 20 to a vertical arm 42$^a$, formed at one end of a horizontal lever 42, fulcrumed at 43 on a standard 43$^a$, formed on or secured to the said rear cross-girt $a^2$ of the main frame A. The free end of a spring 50, secured to said cross-girt $a^2$, bears against the under side of the forward end of the lever 42 and holds the dog 40 normally out of contact with the nail-rod on standard 51. The rear end of the lever 42 is slotted, as indicated at 44, Fig. 7, and through the said slot passes a push-rod 46, whose upper end terminates in a handle 46$^a$, and has two collars 48 and 48$^a$ above and below the lever and at such distances apart as to afford the lever-arm but a limited play between them. The slotted end of the arm of lever 42 is bent upwardly, and has an inclined projection or nose 45 on its under side, for purposes to be explained hereinafter. The lower end of the push-rod 46 has a spherical head, and is supported in a correspondingly-shaped bearing formed in the outer end of a lever or radial arm 49 on rock-shaft E.

Having now described the construction of the machine proper, we will briefly describe the operation thereof.

A nail-rod, having been adjusted to bring its end over the anvil o, is firmly held by the dog 20, this being effected by moving the push-rod 46, through the medium of its handle 46ª, to the outer or rear end of the slot 44 in lever 42. As the slotted arm of the lever is curved upwardly, this movement of the push-rod lifts the dog 40 clear of the standard, whose upper face, being L-shaped, forms with the dog 40 and the vertical arm 42ª of the lever 42 a narrow passage 53ª, Fig. 7ª, for the nail-rod. By moving the push-rod 46 back to the rear end of the slot 44 the dog 40 is lifted above or clear of the vertical portion of the upper face of the standard, thus permitting the nail-rod to be placed in position from the side. The dog 20 is then lifted to a like extent by means of a lever 54, the pivot of which carries a cam or tappet 54ª, that engages the arm 29 on rock-shaft E, (see Fig. 2,) thereby lifting the push-rod 27, and through the latter the dog 20. After the nail-rod is in position the dogs are again released. Of course it will be understood that the dog 40 does not engage the nail-rod except at a certain time, as hereinafter described. The operative parts of the machine are now set in motion through the driving-pulley P on shaft D. The forging-roller r and hammer H' strike the nail-rod alternately, the forging of a nail requiring usually about nineteen blows, of which ten are delivered by the forging-roller and nine by the hammer H'. During this operation the shaft M and cone-disk 6 and the cams 30 and 31 on said shaft M will have made three-fourths of a revolution, at which time the notch 7 in disk 6 will be in a position to allow the roller 5 to drop into it, thereby lifting the cutter end of anvil 1. Simultaneously therewith the cam-face 17 on the opposite face of the disk engages the arm 16 of the bell-crank lever L, whose arm 14 draws over the nail-rod carrier to bring the nail-rod between the uplifted end of the anvil and the cutters 9 and 9'. As the disk 6 continues to revolve, the roller 5 will again move out of notch 7, thereby moving the cutter end of anvil 1 into its normal position between the cutters 9 and 9', severing the nail from the nail-rod, said nail dropping onto the inclined face 9ª, and thence to the ground. During this operation of the anvil-cutter the nail-rod will be held in the position it occupies during the operation of severing the nail. As the anvil 1 reaches its normal position the nose 30ª of the cam-disk 30 comes in contact with the lever or radial arm 29, depressing the same and rocking or tilting the rock-shaft E. This motion of the shaft has the following results: The push-rod 27, through the lever or radial arm 28, lifts the spring-carrier of the dog 20, thereby releasing the nail-rod. The push-rod 46, through the lever or radial arm 49, lifts the rear arm of the lever 42 and depresses its forward arm against the stress of the spring 50, thereby bringing the dog 40 into engagement with the nail-rod to hold the same. As the dog 40 catches hold of the nail-rod the nose 31ª on cam-disk 31 engages the radial arm 32 on rock-shaft I, thereby tilting the same, and through push-rod 34, the rock-shaft E, and with it the carrier of the dog 20. The amplitude of this motion is such as to feed the nail-rod forward a distance equal to the length of a nail. As the nose 31ª is about to leave the lever 32 the nose 30ª is about to leave the lever or arm 29, thereby releasing the push-rod 46, so that the spring 50 can again lift the dog 40 out of engagement with the nail-rod, and simultaneously therewith the push-rod 27 will also recede into its normal position to allow the dog 20 to again engage the nail-rod. As this latter takes place the cam-face 7 on cone-disk 6 moves out of contact with the arm 16 of lever L, the elasticity of the rod-carrier carrying the same into its normal position, and the nose 31ª moves out of contact with the arm 32, when the spring S, acting on radial arm 25, will move the carrier for the dog 20 back into its normal position, thereby feeding the nail-rod a nail-length forward, the described operations being then repeated.

We have described the machine in its operation with a nail-rod that has been pre-heated, and in conjunction with which any suitable devices may be employed to maintain the nail-rod at the proper temperature; or a furnace may be combined with the machine to heat the nail-rod and maintain the same at the proper temperature. We not only prefer the latter arrangement and have provided a furnace especially designed for the purpose in order to save the labor and expense of pre-heating the nail-rod, but we propose, as has hereinbefore been stated, to effect a further saving in time and labor by forging the nails from a continuous nail rod or wire coiled on a suitable revoluble carrier or reel and combine therewith our improved furnace. These features of our invention we will now describe, referring more particularly to Figs. 2, 3, 8, 9, and 10; and we would also state here that we do not desire to claim, broadly, the combination, with the forging and nail-rod-feeding devices of a horseshoe-nail machine, of a furnace interposed between the said devices, as this is well known.

The furnace f consists of a substantially rectangular body that has a contracted projection f', tapering from top downward and from bottom upward, the hole 68, through which the nail-rod passes, being formed in the apex of the angle formed by said tapering projection, and diametrically opposite said hole or opening is a similar opening 67, through which the nail-rod enters the furnace. Longitudinally of the furnace, and slightly above the nail-rod, is a partition or fire-bridge 66, that extends from the rear wall 67$^a$ into the projecting tapering portion $f'$, leaving at the front end of said portion a narrow aperture 69$^a$. The upper face of the fire-bridge at its forward end conforms to the tapering projection $f'$ of the furnace, and thence inclines upwardly to the rear wall 67$^a$ to form a gradually-widening passage 70 for the products of combustion, said passage leading to a chimney 71. The fire-bridge does not extend clear across the wider portion of the furnace, thus forming a lateral fuel-chamber 63, that is open at the top and closed by a suitable cover 63$^a$, said lateral chamber merging into the space 69 below the bridge, which latter space constitutes the combustion-chamber. An inclined grate 61 is arranged at the bottom of the fuel hopper or space 63, and below the same is arranged an ash-pit 62, provided with suitable draft-holes 72, which are or may be provided with suitable draft-regulators. The object of providing a lateral feed-hopper is to prevent the fuel from coming in contact with the nail-rod. On the other hand, the object of providing the tapering extension and arranging the fire-bridge, as described, is to expose a considerably great length of rod to the heat of the fuel and products of combustion, as will be readily understood. By means of this furnace a nail-rod may be heated and maintained at a proper temperature without difficulty. In rear of the machine is arranged a reel, upon which the continuous nail-rod is wound. This reel we preferably mount upon an adjustable bed, so that its position relatively to the horseshoe-nail machine may be adjusted to properly deliver the nail-rod thereto. To this end we provide a bed-frame B, Figs. 3, 14, and 15, the longitudinal girts 86 of which have a flange 86$^a$ along their upper inner edge; and $p$ is the bed-plate, that is provided with suitable grooves $p'$ for the reception of said flanges, so that said plate $p$ is free to slide on the bed-frame B. The plate is adjusted on the frame by means of a pinion 90 on a shaft 89, carrying a crank 91, said shaft having its bearings in plate $p$, and meshing with a toothed rack 88, secured to the cross-girts 86$^a$ of the bed-frame B.

The plate $p$ is provided with suitable bearings 85 for the reel-shaft 84. The reel W consists of a wheel, to the tire of which are secured the holders for the coil of nail-rod. As shown, the spokes or radial arms 80 of the wheel are secured to the inner edge of the rim or tire 80$^a$, thus forming an annular flange provided at equal distances with screw-threaded bearings for the reception of screw-spindles 82, carrying at their outer end a forked bearing 81 or holder for the coil. The outer leg or cheek of the fork is bolted to position, so that it may be removed or turned out of the way to facilitate the putting on of the coil of nail-rod, where such rod is coiled previous to its being put on the reel. As the forked holders are carried on screw-spindles, said holders may be adjusted to the inner diameter of the coil.

The operation of the devices last described relatively to the nail-rod machine and furnace will be readily understood without further description, except to say that, inasmuch as the nail-rod has a motion in a horizontal plane either during the operation of forging or when the rod is carried to the cutters, as described, the front aperture 68 in the furnace is to be of sufficient length to admit of this motion, and to prevent flame or smoke issuing from this aperture we attach to or form on the guide 10 a shield 73, consisting simply of a piece of sheet metal or a metal plate that has an aperture just large enough to admit of the passage of the rod, while the shield 73 is of such size as to at all times cover the slot 68 in the furnace, whatever the position of the nail-rod guide 10.

Having described our invention, what we claim, and desire to secure by Letters Patent, is—

1. In a horseshoe-nail machine, the combination, with a hammer and a cutter, of an anvil provided with cutting-edges and constructed to co-operate with said hammer in forging a nail and with said cutter in severing the forged nail from a nail-rod, substantially as described.

2. In a horseshoe-nail machine, the combination, with an anvil and a forging-roller co-operating therewith, of an auxiliary anvil, a hammer co-operating therewith, and two cutters arranged on opposite sides of the auxiliary anvil, said anvil being constructed to co-operate with the cutters to sever the forged nail-rod, substantially as described.

3. In a horseshoe-nail machine, the combination, with a hammer and two cutters, of an anvil constructed to co-operate with said hammer in forging a nail and with said cutters in severing the forged nail from a nail-rod, and a nail-rod carrier co-operating with the cutters to carry the forged nail thereto to be cut, substantially as described.

4. In a horseshoe-nail machine, the combination, with a vertical anvil and a forging-roller co-operating therewith, of a horizontal anvil and a hammer co-operating therewith, two cutters arranged on opposite sides of the horizontal anvil, said anvil being constructed to co-operate with the cutters to sever the forged nail from the nail-rod, and a nail-rod carrier having a periodical lateral movement to carry the forged nail to the cutters, substantially as described.

5. In a horseshoe-nail machine, the combination, with the forging devices, of a nail-rod carrier having a vibratory motion between the forging devices, for the purposes specified.

6. In a horseshoe-nail machine, the combination, with a forging-roller and an anvil co-operating therewith, of a nail-rod carrier, a hammer operating to impart a vibratory movement to the carrier, and an anvil co-operating with said hammer, substantially as described.

7. In a horseshoe-nail machine, the combination, with a hammer adapted to reciprocate in a horizontal plane, an anvil adapted to co-operate with said hammer, and two cutters arranged on opposite sides of the anvil, said anvil being adapted to co-operate with the cutters to sever a nail from the rod, of a nail-rod carrier adapted to move to and from the cutters, substantially as and for the purposes specified.

8. In a horseshoe-nail machine, the combination, with the forging devices, the cutters for severing the forged nail from a nail-rod, and the feeding devices, of a reel for the reception of a coil of continuous nail-rod, said reel being adjustable toward and from the feeding devices, substantially as and for the purposes specified.

9. In a horseshoe-nail machine, the combination, with the forging devices, the cutters for severing the forged nail from a nail-rod, and the feeding devices, of a revoluble carrier for the reception of a coil of continuous nail-rod, said carrier having its perimeter constructed and adapted for adjustment, substantially as and for the purposes specified.

10. The combination, in a horseshoe-nail machine, of an elastic or springy nail-rod carrier with an anvil and a hammer adapted to impart motion to the carrier toward the anvil, substantially as and for the purposes specified.

11. The combination, with the hammer H and the tappet 12, secured to the hammer-stock, of the nail-rod carrier 11, provided with the boss or projection 11ª, substantially as and for the purposes specified.

12. The combination of an anvil constructed with cutting-edges on its under side and having a periodical vibratory movement with the cutters 9 and 9′, arranged on opposite sides of the anvil, substantially as and for the purposes specified.

13. The mechanism for imparting a periodical vibratory movement to the pivoted cutter-anvil 1, consisting in the combination, with said anvil having an extension 2, in which is journaled a roller 5, of the revoluble cone-disk 6, provided with a notch 7, substantially as described.

14. The combination, with the cutters 9 and 9′ and the cutter-anvil 1, co-operating therewith, as set forth, to sever a forged nail from a nail-rod, and an elastic or springy nail-rod carrier 11, provided with the slotted arm 13, of the bell-crank lever L, connected with said slotted arm, and the revoluble cone-disk 6, provided with the cam-face 17, adapted to co-operate with the bell-crank lever to impart motion in one direction to the nail-rod guide, substantially as and for the purposes specified.

15. The combination, with the feeding and forging devices of a horseshoe-nail machine, of the furnace f, constructed with the tapering projection f′, the combustion-chamber 69, the fire-bridge 66, the flue 70, and the fuel-magazine 63, arranged substantially as described, and for the purposes specified.

16. The combination, with the furnace for heating the nail-rod, said furnace having a transverse slot for the exit of said nail-rod, of a vibratory nail-rod carrier and a shield or guard-plate 73, applied over said slot and having an aperture for the passage of the nail-rod, said shield being connected to and vibrating with the nail-rod carrier, substantially as and for the purposes specified.

17. The nail-rod-feeding devices consisting of a clamp having a periodical reciprocating movement and a push-rod to open the jaws of the clamp just prior to and during said vibratory motion, in combination with an auxiliary stationary clamp having its jaws normally open and a push-rod operating to close said jaws and maintain the same closed as soon as the reciprocating clamp commences to move and during its motion in one direction, substantially as and for the purposes specified.

18. The combination, with the cam-disk 31, the connected rock-shafts I and F, the radial arm 32 on rock-shaft I, the radial arm 24 on rock-shaft E, and the spring-actuated dog 20, co-operating with the upper end of the arm 24 to clamp the nail-rod, of the rock-shaft F, the lever or arm 28, and the push-rod 27, connecting the lever with the spring-dog, substantially as and for the purposes specified.

19. The combination, with the cam-disk 31, the rock-shaft I, its radial arms 32 33, the rock-shaft F, its radial arms 24 25, a connection between the latter, and a connection between the radial arm 25 and the radial arm 33, the spring 22, and the dog 20, carried by said spring, of the rock-shaft E, the lever 28 thereon, and the push-rod 27, connecting said lever with the spring 22, substantially as and for the purposes specified.

20. The combination, with the standard 51, the spring actuating lever 42, and the locking-dog 40, of the cam-disk 30, the rock-shaft E, and its levers 29 and 49, and the push-rod 46, connecting the lever 49 with the lever 42, substantially as and for the purposes specified.

21. The combination, with the standard 51, the spring-actuated lever 42, having its rear end slotted and curved upwardly, and the dog 40, secured to said lever and arranged relatively to the standard 51, as described, of the rod 46, extending through the slotted end of the lever and having the shoulders 48 and 48ª, and the lever 49 on rock-shaft E, substantially as and for the purposes specified.

22. The combination, with the spring 22, carrying the dog 20, the push-rod 27, the rock-shaft E, and the levers 28 and 29, of the hand-lever 54 and the cam 54ª, substantially as and for the purposes specified.

23. The combination, with nail making and cutting devices of a horseshoe-nail machine, of a reel provided with radial forked bearings for the reception of a coil of continuous nail rod or wire, one side of said forked bearings being detachable, substantially as and for the purposes specified.

In testimony whereof we affix our signatures in presence of two witnesses.

CHRISTIAN ALMAR HANSEN.
   OLE GUNERIUS GULBRANDSEN.

Witnesses:
 ALFRED J. PRUYN,
 H. BOUMRIE.